(No Model.) 3 Sheets—Sheet 2.
A. BOLLÉE, FILS.
MOTOR VEHICLE.

No. 584,666. Patented June 15, 1897.

Witnesses:
H. K. Boulter

Inventor:
Amédée Bollée fils
By Wm. E. Boulter,
Attorney (No Model.) 3 Sheets—Sheet 3.
A. BOLLÉE, FILS.
MOTOR VEHICLE.

No. 584,666. Patented June 15, 1897.

Witnesses: Inventor.
H. K. Boulter Amédée Bollée, fils
R. Thorkup By Wm. E. Boulter,
Attorney

United States Patent Office.

AMÉDÉE BOLLÉE, FILS, OF LE MANS, FRANCE.

MOTOR-VEHICLE.

SPECIFICATION forming part of Letters Patent No. 584,666, dated June 15, 1897.

Application filed August 7, 1896. Serial No. 602,004. (No model.) Patented in France January 27, 1896, No. 253,437.

*To all whom it may concern:*

Be it known that I, AMÉDÉE BOLLÉE, Fils, a citizen of the Republic of France, residing at Le Mans, France, have invented certain new and useful Improvements in or Relating to Motor or Self-Propelled Vehicles, (for which I have obtained Letters Patent in France, No. 253,437, dated January 27, 1896,) of which the following is a specification.

The improvements in automobile carriages forming the object of this invention are represented in a more or less diagrammatic manner in the accompanying drawings, in which—

Figure 1:
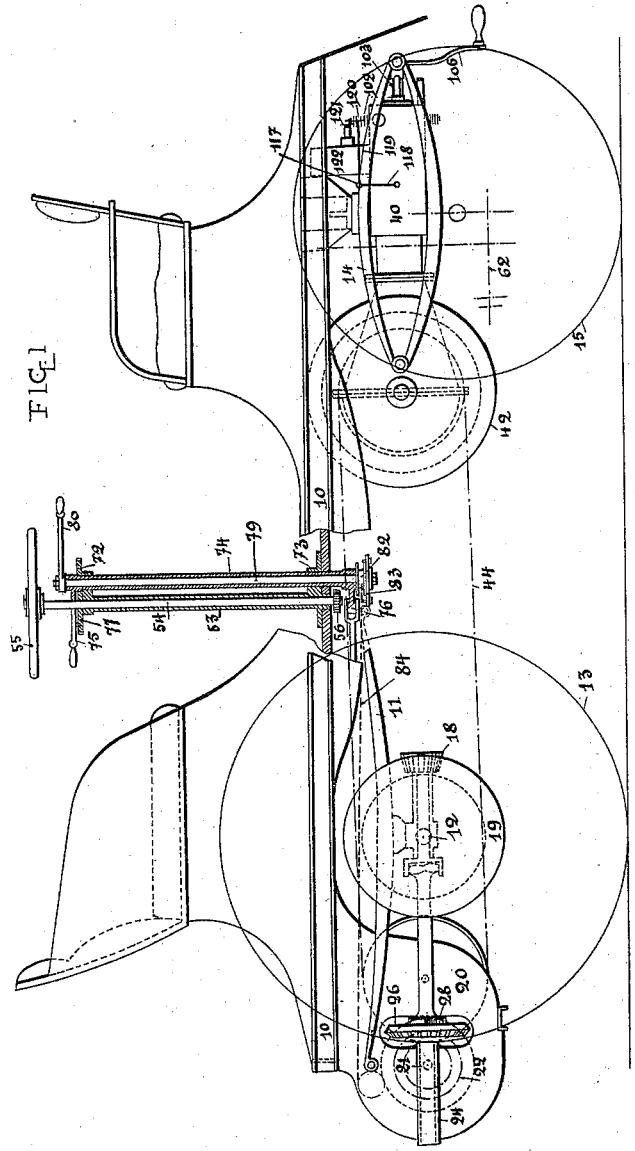
Figure 2:
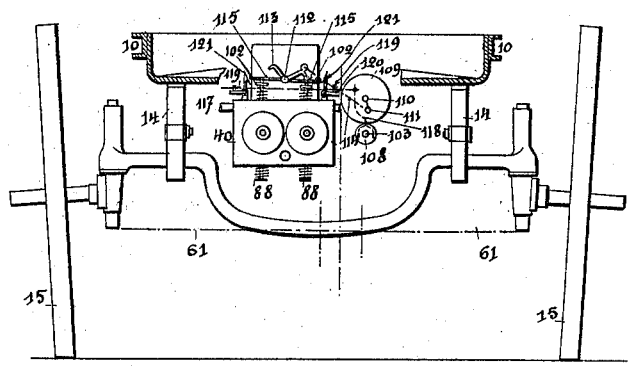
Figure 3:
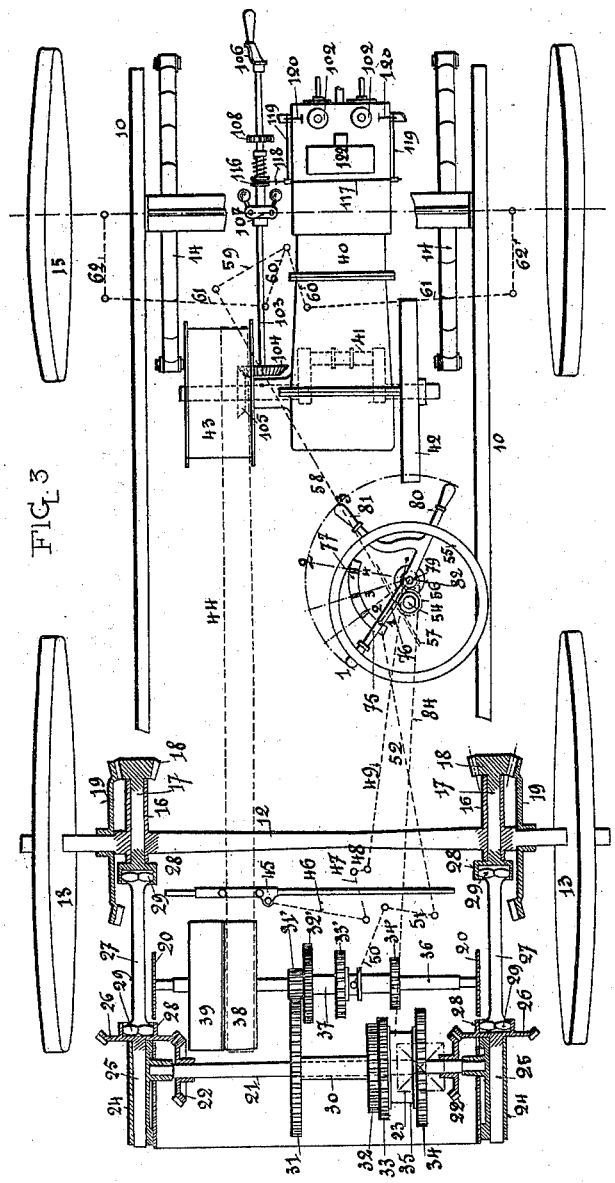

Figure 1 is a longitudinal elevation of the automobile carriage. Fig. 2 is a front view, and Fig. 3 is a plan of Fig. 1 with the carriage-body removed. These views representing the automobile carriage or autocar as a whole are supplemented by detail views Figs. 4, 5, 6, and 7, hereinafter described.

The type of the carriage illustrated is a four-seat vehicle, the seats being opposite each other.

The advantages obtained by my invention may be summed up as follows: first, dispensing with driving-chains for driving-wheels, whereby the drawbacks connected with the use of such chains are avoided; second, possibility of giving to the wheels the inclination usual in carriage-wheels; third, arrangement of the driving parts and gearing so that they are easy of access, whereby their inspection and keeping in good condition is facilitated; fourth, arrangement of such parts under the floor of the carriage so that the carriage-frame may have an even floor without projections, on which floor any desired kind of carriage-body may be mounted; fifth, arrangement of steering and operating mechanism in front of the driver, the number of such parts being very small and their operation extremely simple; sixth, possibility of placing said apparatus in any desired place of the carriage according to the description of carriage-body employed.

The chief parts of the motor-carriage as a whole and its details are represented in the accompanying drawings only schematically, various details of construction not forming essential features of my invention being omitted.

The frame 10, constituted either by tubes joined together or by longitudinal and transverse beams or ties of desired cross-section, is made in the form of a rectangle and is supported at the back upon two ordinary springs 11, connected to a special axle 12, carrying the driving-wheels 13.

In front the frame 10 rests on two double springs 14, to which is secured the bent axle of the fore carriage, having two pivots of well-known description, the steering-wheels 15 being of course mounted upon the journals of this axle.

The rear axle 12 has either formed in one piece with it or secured on it two sleeves 16, which are horizontal and at right angle to the axle and are therefore parallel to the axis of the carriage. These two sleeves are arranged under the suspension-springs 11 or outside them, their horizontal axes intersecting the axes of each journal of the axle.

In the interior of each sleeve 16 is supported and turns a shaft 17, on one end of which is keyed a bevel-pinion 18, while each rear wheel 13 of the carriage is provided with a bevel-wheel 19, arranged so as to engage with the corresponding pinion 18.

The result of the special arrangement of the toothed gears 18 19 is that no oscillations of the axle 12 will have any influence on the regular working of said gears and that these gears or wheels will always remain in operative engagement.

At the back of the frame 10 two depending brackets 20 support in bearings at the same level as the normal level of the axle 12 a shaft 21, parallel to the said axle 12, and therefore transverse relatively to the carriage. This shaft carries keyed at each extremity bevel-pinions 22 and between the two pinions 22 differential gear 23, of well-known description, this differential gear transmitting to said pinions the movement which it receives from the motor.

The pinions 22 are arranged inside the brackets 20. Outside these brackets are secured two parallel horizontal sleeves 24, the respective axes of which form the continuation of the respective axes of the sleeves 16 on the axle 12 when the latter is at its normal level. Each sleeve 24 serves as a bearing for a spindle 25, on one end of which is keyed a bevel-wheel 26, arranged so as to engage with the corresponding pinion 22.

The bevel-wheels 26 drive the pinions 18 by means of their respective spindles 27, having articulated joints, whereby they are able to follow any oscillation of the axle 12.

The strong and simple construction shown of the articulated joints of the spindles 27 is as follows: The shafts 17 and 25 are each provided at their ends opposite each other with a square or rectilineal box 28, in which loosely enter the corresponding extremities 29 of the spindle 27, which are also made square. The sides of the square portions 28 29 are of a greater width than the diameter of the spindles 17 25 27, and the depth or thickness of these sides is slight, so that the slight play between the parts, one in the other, is quite sufficient to enable the spindles carrying said square portions to take an inclination of several degrees relatively to each other.

The device for coupling the shafts 17 and 25, which has just been described, constitutes a new means for operating driving-wheels of any motor vehicles suspended on springs, as this device does not depend upon the nature of the motor nor on the mode of transmission of movement from the latter to the shaft carrying the differential gear. This shaft might be placed equally well at the back of the axle 12 of the driving-wheels, as illustrated in the accompanying drawings, or in front of and at any distance from said axle, provided only that the oscillating coupling-shafts 27 are of sufficient length; also, the position of the pinions 18 on their shafts 17 could be inverted and said pinions could engage with their wheels 19 behind the axle.

In my new arrangement the respective pinions of the differential gear 23 are driven by a sleeve 30 of special shape, mounted loosely on the shaft 21 and carrying four spur-wheels 31 32 33 34 and a drum 35 for a band-brake. Another shaft 36, situated in front of and parallel to the shaft 21 and mounted in the same brackets 20, carries a sleeve keyed onto it, but capable of longitudinal movement upon the shaft, and on this sleeve are four spur-wheels 31' 32' 33' 34', which can engage, respectively and separately, with their corresponding wheels 31 32 33 34, and constitute thus four transmission-gears with different ratio of transmission of speed between the two shafts 21 and 36.

The arrangement of gears 31 31', 32 32', 33 33', 34 34' relatively to each other is such as to prevent the possibility of more than one pair being in engagement at a time, and also to cause the speed to be changed progressively from the lowest speed to highest, or vice versa. It is evident that the number of different degrees of speed of movement of the carriage may be varied and greater or smaller than the four illustrated in the accompanying drawings and above described. The shaft 36 also carries two ordinary tranmission-pulleys, one of them, 38, being fast and the other, 39, loose.

The motor 40, the description of the novel part of which will be given hereinafter, is placed in front horizontally between the suspension-springs 14 and consists of two cylinders arranged in front and the crank-shaft 41, carrying on one side a fly-wheel 42 and on the other side a wide pulley 43, which is connected by an ordinary transmission-belt 44 with the fast and loose pulleys 38 39 of the shaft 36.

The throwing in and out of gear of the motor is effected by causing the belt 44 to pass from one of the pulleys 38 39 to the other by means of any suitable mechanism—such, for instance, as a disengaging fork 45, operated by a system of articulated levers 46 47 48 49. An engaging fork 50, with an angle-piece 51 and rod 52, enables the sleeve 37 to be moved longitudinally in either direction, and consequently to produce change of speed in accordance with either combination of gear 31 31', 32 32', 33 33', or 34 34'.

The control of the apparatus is entirely within reach of the driver or operator, the arrangement and construction of the parts being substantially as follows: A vertical tube 53, firmly secured to the floor, (of the vehicle,) serves as a support and bearing for a shaft 54 in the interior of the former, at the upper end of which is keyed a steering hand-wheel 55. At the lower extremity of the shaft 54 is keyed a pinion 56, which transmits to the journals of the front axle the movement communicated by the steering hand-wheel 55 by means of a toothed rack 57 and the combined system of levers and connecting-rods 58 59 60 61 62, such as is well known and parts of which I have improved, as may be seen in Fig. 4. These improvements consist in a new method of articulating the steering-rods 61 to the transmission-levers 60 62. Each connecting-rod 61 employed for steering has a ball-shaped end with a spherical concentric hollow space 64, in the bottom of which space is a hole 65. The corresponding extremities of the levers 60 and 62 are respectively provided with a vertical pin 66, with a spherical portion 67 of the same diameter as that of the hollow space 64. On the top of the spherical portion 67 the pin has a screw-threaded stem 68, the diameter of which is smaller than that of the hole 65 in the bottom of said hollow space 64.

Figure 4:
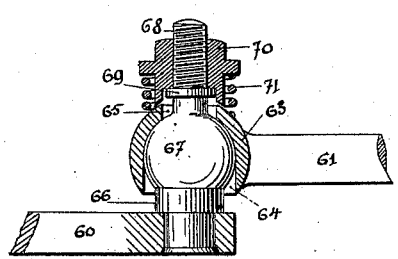

It is clearly seen in Fig. 4 how the connecting-rod 61 rests on the ball 67 of the lever 60. The screw-threaded stem 68 has a collar 69 above the connecting-rod 61 and carries a nut 70, which presses the connecting-rod 61 against its spherical joint 67 by means of a spring 71. This arrangement, which could be reversed, has for its main object to dispense with the projecting or overhanging parts of the usual system having two intersecting axes and to avoid wear and noise of the part. In front of the tube 53, supporting the steering, another tube 74 is secured in a vertical position and rotates in two bearings 72 73, secured to said tube 53. This tube 74 carries at its upper extremity its operating horizontal lever 75 and at its lower extremity a small rod 76, actuating the rod 52 of the speed-changing device. The lever 75 turns over a horizontal arc 77 of a circle, secured to the supporting-tube 53 and provided on its upper edge with four notches, in each of which the lever 75 can engage by reason of its elasticity and therefore become temporarily held therein. Each notch corresponds to a certain speed of the carriage, the notch 1 corresponding to the smaller speed 2, and 3 to the intermediate speeds, and 4 to the highest speed, these speeds being of course in accordance with the speeds produced by the respective combinations of gears 31 31', 32 32', 33 33', and 34 34'.

In the interior of the tube 74 is supported and rotates a shaft 79, carrying at its upper extremity a little above the lever 75 a double lever—that is to say, with two horizontal branches 80 81. At its lower extremities the shaft 79 carries keyed on it a deeply-grooved pulley 82, the bottom 83 of which acts as a cam and coöperates with the extremity of the lever 49 to effect the engagement or disengagement of the belt 44.

The throwing of the belt 44 out of gear is effected by the cam 83 when the lever 80 is turned from the position 3 into position 2. When the lever 80 passes beyond position 2, the cam 83 has no further influence on the lever 49. Throwing the belt 44 into gear is of course effected by bringing the lever 80 from the position 2 into position 3.

In the bottom of the groove of the pulley 82 is secured the extremity of a chain or metallic cable 84, the other extremity of which is wound around on the brake-drum 35 for the purpose of applying the brake. The chain or the cable 84 is put in tension and so causes the brake to act only when the lever 81 approaches position 1.

The working of this combined arrangement or device is as follows: The driver holds the steering hand-wheel 55 with his right hand, while with his left hand he operates the levers 75 80 81. When it is desired to start, the lever 75 is placed in the position 1, corresponding to the slow speed, while the lever 80 is at the point 2, the position at which the belt 44 is out of action. Then the carriage is started by bringing the lever 80 to the point 3, whereby the belt 44 is brought into gear—that is to say, it passes from the loose pulley 39 to the fast pulley 38. In order to stop, it is sufficient to disengage or throw out of gear the belt 44 by bringing the lever 80 from the position 3 into the position 2. In order to change the speed when the carriage is traveling, the driver grasps the lever 80 and pulls it toward himself; the fingers of the hand being open till the lever 75 is reached. Then the hand is closed so to inclose both the levers 75 and 80, which may then be considered as practically one. Upon closing the hand the lever 75 is raised and freed from the retaining-notch of the sector 77 and is then moved above the notch of the said sector 77, corresponding to the desired speed, and released when it drops and remains fixed in the notch. The lever 80 is then pushed till it is in the position for throwing the belt 44 into gear, and thus the traveling of the carriage at the desired speed is obtained. In order to apply the brake, the lever 80 is first pulled toward the driver till it comes into position 1, whereby the belt 44 is thrown out of gear without, however, causing the brake to act. Then the lever 80 is released and the lever 81 is grasped, which by the movement of the lever 80 has been brought within reach of the hand. This lever 81 is then pulled toward the driver, the result of which action is to produce the winding up of the chain or cable 84 in the groove of the pulley 82, and consequently causing the brake to act by tightening the said chain on the drum 35. When operating in the inverse order to that just described, the brake is first released and then the belt 44 thrown into gear. The arrangement of these combined operating-levers may be applied to any automobile carriage in which it is necessary to steer, to change speeds, to throw the gearing in or out of engagement, and to apply the brake, whatever be the method of transmission used, whether toothed wheels, friction devices engaging and disengaging gear with belts or otherwise, and whether band or shoe brakes be employed. In all cases mechanism such as described above may be used.

The motor 40, which has been specially devised with a view of adapting it for motor-vehicles, is a four-cycle petroleum-motor having two cylinders. These two horizontal cylinders may be cast in one piece with a water-jacket for cooling purposes common to both of them, their axes being in the same horizontal plane. The compression-chambers are formed in one piece with the cylinders, which are closed at their end by a plug having an igniter in its center. The other end of the cylinders has an outer yoke screwed onto a solid framing, affording at the same time a framing for the crank-shaft and a reservoir for the oil for lubricating the connecting-rods and bearings of the driving-shaft.

Figure 6:
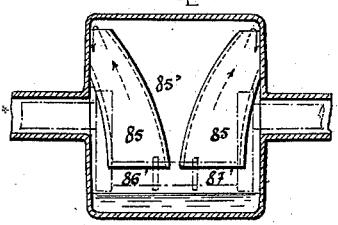
Figure 7:
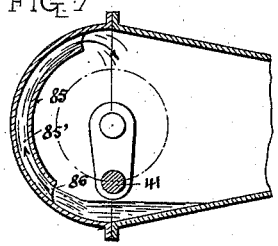

In order to prevent the oil being projected in too great a quantity toward the interior of the cylinders of the motor, I apply to the framing the following new device: This framing is shaped as illustrated in Fig. 6 in front sectional view and in Fig. 7 in side elevation, and is provided at a suitable height and in front of each connecting-rod with an arched plate 85, held parallel to the wall at a small distance from it by two oblique ribs 85', of cast-iron. I thus form on the inner surface of this framing two oblique passages 86 87, one for each connecting-rod of the motor, The result of these arrangements is that if the crank-shaft 41 turns in the direction of the arrow part of the oil is projected by the connecting-rods tangentially to the framing and passes upward in such manner that this oil passing the oblique passages 86 87 is directed by the latter toward the sides and instead of falling back in the direction of the axis of the cylinders escapes along the walls in order to be used for lubricating the bearings of the crank-shaft 41.

The driving-shaft 41 has only one crank-pin for both the connecting-rods, so that the pistons travel at the same time and in the same direction. This crank-shaft passes out of the framing on each side and, as has been previously described, carries a fly-wheel 42 and the wide driving-pulley 43. In the fly-wheel 42 and in the pulley 43 there are arranged balance-weights for balancing the connecting-rods and the pistons in order to diminish as much as possible the vibration produced by the momentum of said parts.

The admission and exhaust valves are arranged at the end of the compression-chambers, their spindles being vertical, and project at the top and bottom beyond the water-jacket, their springs being arranged outside.

Figure 5:
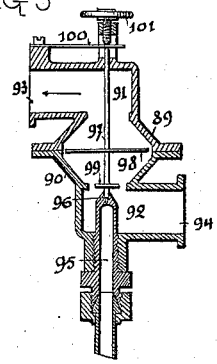

The admission-valves 88 are automatic and admit the charge into the cylinders during the suction stroke, the explosion-mixture being supplied from a carbureter common to both cylinders, which carbureter is illustrated in detail in vertical section in Fig. 5. As is readily seen by examining this figure, the carbureter is mainly constituted by two truncated conical caps 89 90, having vertical axes connected to each other at their larger bases, their small bases being in communication with chambers 91 92, having, respectively, air-inlet and air-outlet branches 93 94. A tube 95 rises vertically in the center of the lower cone 90 and ends in the interior of said cone, where it is provided with a hole 96, having the shape of a truncated cone of small size, the petroleum contained in a reservoir being brought into the carbureter by this tube 95. A light spindle 97 is arranged in the interior in the direction of the axis of the device and ends at its lower end by a conical part, which serves for closing the hole 96 of the tube 95. The upper end of the spindle 97 passes freely through a hole, which also guides it. The said spindle carries a disk 98 and under the latter another disk 99 of a smaller diameter than 98, and outside spring 100 presses slightly against the end of the spindle 97. A regulating-screw 101 regulates the height to which the latter may rise.

The working of the carbureter is as follows: The motor induces a suction-draft which passes through the carbureter from bottom to top, and in its ascending movement causes, by means of the disk 98, the rod 97 to rise. The rising of the spindle 97 allows the petroleum to enter through the hole 96 of the tube 95, the supply being regulated by means of the screw 101. As soon as it enters the petroleum is projected against the small disk 99, where it spreads in a thin layer from the center to circumference, and at the edge of this disk the greater part of this petroleum is comminuted or broken up by the draft of air. The drops being still of a certain size are further comminuted or broken up by the edge of the second disk 98.

Owing to its particular shape the carbureter causes the current of air passing through it to undergo a series of contractions and expansions, the result of which is a perfect intermingling or mixture of the air and petroleum. The carburation may be further facilitated by previously heating the air. The exhaust-valves 102 are opened alternately every two strokes for discharging the burned gases. There is therefore one driving stroke in each revolution.

In the same plane as the axes of the cylinders is arranged parallel to said cylinders a shaft 103, driven by means of two miter-wheels 104 105 from the driving-shaft 41, so that the shaft 103 rotates with the same speed as the driving-shaft 41. The extremity of the shaft 103 has a handle 106, (with mechanism for automatically throwing it out of gear,) by means of which handle the starting of the motor is effected. The shaft 103 also carries a centrifugal governor 107 and a spur-pinion 108, arranged so as to engage with a wheel 109 of a diameter twice as large, keyed on a shaft 110, arranged and rotating above the shaft 103, one side of the wheel 109 having a crank-pin 111, which in consequence of the rate of transmission between the pinion 108 and wheel 109 rotates with the wheel 109 at a speed equal to half that of the motor.

Between the exhaust-valves 102 and above them is pivoted on a fixed pin 112 an oscillating lever 113, having the shape of a very open V and receiving alternating motion from the crank-pin 111 by means of a connecting-rod 114. Each end of said lever 113 depresses at the end of its downstroke its corresponding exhaust-valve 102.

The respective operations of the valves 102 and the lever 113 are calculated so as to produce opening and closing of each valve exactly at the desired moment. On the same fixed pin 112 of the lever 113 are mounted loose and independently of each other two small levers 115, respectively resting about the middle of their length on the extremity of the spindles of the corresponding valves 102. The ends of the lever 113 bear directly on these levers 115, which partake of the movements of the corresponding valves 102, descending and rising at the same time as the latter.

The governor 107 is made, as usual, with a ring with a circular groove 116, which ring can move longitudinally on the shaft 103 when the speed alters.

Over the water-jacket of the cylinders is mounted a transverse oscillating shaft 117, connected to the groove-ring 116 of the governor 107 by a bifurcated lever 118. On this shaft 117 are fixed to rigid rods 119, extending toward the front and very nearly horizontal. These different parts are combined so that when the balls of the governor 107 are thrown out in consequence of an increase of speed an ascending movement of the end of the keys 119 is produced.

To the right of the right-hand side valve 102 and to the left of the valve 102 on the left-hand side are respectively mounted two small oscillating angle-pieces 120, one of the branches of which is nearly vertical and is provided with a hook 121, while the other branch is very nearly horizontal and passes under the corresponding extremity of the rod 119, against which extremity the said branch is pressed by a spring on it, but not shown in the drawings. The hook 121 is turned toward its corresponding valve, and its notched part is placed at the desired height in order to enable it to engage with the end of the corresponding lever 115 when the latter is at the end of its downward stroke. When said engagement takes place and during the time the lever remains in engagement, the valve 102, which has been opened, cannot close.

From the preceding it will be understood that the engagement of the valves 102 is produced by the balls of the governor 107 being thrown out, whereby the valves come into engagement and remain open each time that the motor works at too high a speed. They become disengaged and begin to work as usual when the speed again becomes normal. This device is arranged in such manner that one valve comes into engagement before the other in order not to suppress at one time more than half of the power of the motor. It is evident that the said device could be arranged in an inverted order—that is to say, the admission-valves could be arranged at the top and the exhaust-valves at the bottom. The shaft 105 of the governor could be also arranged at the right or left hand side of the motor.

The cooling of the cylinders and valves is effected by means of a water-jacket, and for this purpose a small reservoir 122 projects from the water-jacket and is in open communication with it. The water-level is maintained constant in the reservoir 122 by an ordinary supply-float which admits water into said reservoir 122 when necessary from another reservoir arranged in any suitable part of the vehicle. When the water in the cylinder-jacket reaches a temperature of 100° centigrade, it begins to give off steam, which escapes into the atmosphere through an exhaust-pipe. This system of cooling enables the main water tank or reservoir to be placed in any convenient place remote from the motor—under a seat, for instance—so that the water in this tank never becomes hot and causes no inconvenience to the travelers.

One pipe is sufficient to place it in communication with the cylinders, and the latter are always surrounded by water of the same temperature of 100°, even after the water has been partially renewed.

The steam produced may be condensed in a surface condenser placed higher than the cylinders by means of the following arrangement of parts, causing the steam to pass through said condenser without having recourse to any mechanical means: A pipe starting from the upper part of the tank 122, consequently above the water-level, and proceeding continuously in an upward direction leads the steam to the upper part of the condenser. Another pipe beginning at the lower part of the condenser and passing always in a downward direction conducts the condensation-water into the cylinder-jacket; but under the water-level this latter pipe I call the "return-pipe." A third pipe, the discharge-pipe, places the lower part of the condenser, or what is the same thing, the return-pipe, in open communication with the atmosphere. This discharge-pipe must be so placed as not to lead off the current of condensation-water, which must always pass through the return-pipe.

From the preceding it will be understood that the steam produced in the jacket of the cylinders has no other free outlet except the pipe which leads it into the condenser, for the steam cannot escape through the return-pipe without first overcoming the pressure of the column of water in the latter, and the effect of this column of water, the height of which is regulated automatically, is to balance the pressure of the steam, which is necessary to overcome its passage into the condenser. If the whole of the steam is not condensed, the excess escapes freely through the discharge-pipe. The float then permits the necessary water to enter to replace the quantity that has disappeared.

The shape or the manner of designing the condenser itself may vary. The only conditions necessary to the proper working are as follows: The condenser must be placed higher than the cylinders, should be well exposed to the wind, and the steam must pass through it in the same continuous direction.

Having now particularly described and ascertained the nature of the said invention and in what manner the same is to be performed, I declare that what I claim is—

1. In a vehicle of the character described, the combination with a shaft 12 carrying driving-wheels, of sleeves carried by said shaft extending at right angles thereto, shafts 17 revolubly mounted in the sleeves, gearing between the latter shafts and the shaft 12, a shaft 21, a driving-shaft, differential gearing between the latter shaft and shaft 21, sleeves on the shaft 21, shafts 25 loosely mounted in the latter sleeves, gear-wheels on the shafts 25 gearing with gear-wheels on the shaft 21, and spindles having an articulated connection at its ends with the gear-wheels on shaft 25 and the shafts 17, and transmitting rotation from the said gear-wheels to the shafts 17.

2. The combination with the steering-rods 61, having hollow spherical ends, of the levers 60, 62 each provided at one end with spherical portion extending within the spherical ends of the rods 61, and adapted to have a universal motion therein, and springs acting to hold the spherical ends of the rods 61 in close contact with the spherical ends of the levers 60, 62.

3. The combination with the steering-rods 61 having hollow spherical ends, of the levers 60, 62 each provided at one end with a spherical portion extending within the spherical ends of the rods 61, and adapted to have a universal movement therein, threaded shanks on the spherical portions of rods 60, 62, nuts threaded on said shanks, and springs confined between the nuts and the said spherical ends of the rods 61, as and for the purpose specified.

4. The combination with a motor a shaft carrying fast and loose pulleys a belt adapted to communicate motion to said shaft from the motor and a belt-shifting device for shifting the belt from one pulley to the other, of an operating-shaft, connections between the latter and the belt-shifting device, a brake device a second operating-shaft, and connections between the latter shaft and the brake device whereby the belt is first shifted from the fast to the loose pulley before the brake device can be operated.

5. The combination with a motor, a shaft carrying fast and loose pulleys, a belt adapted to communicate motion to said shaft from the motor, a belt-shifting device for shifting the belt from one pulley to the other, of an operating-shaft connections between the latter and the belt-shifting device, a shaft carrying driving-wheels, variable-speed gearing between the latter shaft and the shaft carrying the pulleys, means for shifting the speed-gearing to vary the speed of the vehicle, and means whereby the belt-shifter is first operated to shift the belt before the speed-gearing-operating means can operate.

6. The combination with the rotatable shaft 79, of the tube surrounding it, a pulley on the lower end of the shaft, having a cam portion, a lever operated by said cam portion, a driving-shaft carrying fast and loose pulleys, a motor, a belt communicating motion from the latter to the driving-shaft, a belt-shifting device, connections between the lever and the shifting device, a two-armed or forked lever on the upper end of the shaft, a lever on the upper end of the tube adapted to be temporarily held in various adjusted positions, a rod at the lower end of the tube, a second rod connected with and operated by said first rod, a driven shaft carrying driving-wheels variable-speed gearing between the latter shaft and the shaft carrying the pulleys, and means intermediate the said second rod and the speed-gearing, to shift the latter to effect a change in speed, all arranged as and for the purposes specified.

In testimony whereof I have hereunto set my hand in the presence of the two subscribing witnesses.

AMÉDÉE BOLLÉE, Fils.

Witnesses:
LOUIS SULLIGER,
J. ROBELET.